United States Patent Office 2,978,428
Patented Apr. 4, 1961

2,978,428

AQUEOUS SUSPENSIONS OF COLLOIDAL GRAPHITE AND THEIR PREPARATION

David C. Aberegg, Columbus, Ohio, assignor to Surface Chemical Development Corporation, Columbus, Ohio, a corporation of Ohio No Drawing. Filed Aug. 1, 1957, Ser. No. 675,556

5 Claims. (Cl. 260—29.6)

The inventions disclosed in this application relate to colloidal graphite. In illustration thereof I have disclosed novel methods of preparing colloidal graphite and compositions prepared thereby.

Heretofore both oil and water suspensions of colloidal graphite have been prepared. Such suspensions are for sale on the open market. However, so far as I know, no one has heretofore prepared a suspension of colloidal graphite in water which is stable throughout a range of from pH 4.0 to pH 11.3 or higher.

Such a colloidal suspension of graphite in water is very useful for many purposes. For instance, such a suspension is useful in the preparation of coatings for molds used in forming metal and especially glass articles. Heretofore it has also been proposed to distintegrate solid substances to enable them to be colloidally dispersed in media in which they are normally non-soluble by subjecting finely divided particles thereof to continuous attrition in the presence of a protective hydrophile colloid dispersed in an aqueous medium. However, I have discovered an agent for the grinding of graphite to a colloidal state which is incomparably more effective in such attrition process and have discovered that the amount of such agent required does not depend on the mass of the graphite. Instead it appears to depend, and I hypothesize that it depends, on the area of surface of the graphite.

One of the objects of my invention is the provision of a new method of preparing colloidal graphite.

A further object of my invention is the provision of a colloidal graphite which is stable in an acid-alkaline range of from pH 4.3 to pH 11.3 or higher.

A further object of my invention is the provision of a new composition of matter comprising a colloidal graphite.

Further objects and features of my invention will be apparent from the subjoined specification and claims.

My method of preparing colloidal graphite comprises the mixing of particles of graphite, water and polyvinyl pyrrolidone in desired proportions and then milling the mixture to reduce the size thereof.

I prefer to mix the ingredients in proportions of about 200–250 parts by weight of water to 100 parts of graphite with an amount of polyvinyl pyrrolidone depending on the amount of the surface of the graphite. I prefer to add the graphite in small portions intermittently and alternately adding proportionate amounts of the polyvinyl pyrrolidone until the total amount of both substances are added. Then I prefer to mill the suspension mixture.

Following are examples of the practice of my invention:

*Example I*

300 grams Dixon micronized graphite
700 grams distilled water
12 grams General Aniline and Film Corporation K–30 polyvinyl pyrrolidone I added a small portion of the graphite to the water with stirring creating a high viscosity suspension. I then added a small portion of the pyrrolidone with stirring reducing the viscosity. I repeated with additional small portions of graphite and additional small portions of the pyrrolidone alternately in a similar manner until all of the ingredients were thoroughly mixed in suspension. I then milled in a fluid shear mill for two hours.

On standing overnight, an ebony black supernatant layer of water-thin consistency of about ¼" was noted. This laid over a lower high-viscosity (about 5-8000 cps.) thixotropic layer. The supernatant layer was decanted. The supernatant layer was tested. It was filtered through Whatman No. 40 filter paper. It was stable to electrolyte between the pH of 4.0 and 11.3 without coagulation or precipitation. While General Aniline and Film Corporation polyvinyl pyrrolidone K–30 (indicating molecular weight) was used in the above example and in the other examples, any similar polyvinyl pyrrolidone is suitable.

In producing colloidal graphite according to the above example, I prefer to decant the supernatant layer recovering the colloidal graphite previously produced, then to add more polyvinyl pyrrolidone to the high viscosity thixotropic layer to reduce its viscosity and regrind.

*Example II*

600 grams Dixon micronized graphite
1400 grams distilled water
16 grams of General Aniline and Film Corporation K–30 polyvinyl pyrrolidone I added a small portion of the graphite to the water with stirring creating a high viscosity suspension. I then added a small portion of the pyrrolidone with stirring thus reducing the viscosity. I repeated this with additional small portions of the graphite and with additional small portions of the pyrrolidone alternately in a similar manner until all of the graphite and 10 grams of the pyrrolidone had been added. I then milled in a fluid shear mill for two hours. Upon standing for 24 hours a clear water supernatant layer resulted, containing substantially no graphite. Thereupon I added 6.0 grams more of the pyrrolidone with mixing. I then milled the suspension. After standing for 24 hours more a black supernatant layer resulted although the layer was not as black as the supernatant layer in Example I. On testing, it filtered through Whatman No. 40 filter paper and was stable to electrolyte in the range of pH 4.0 to pH 11.3 without coagulation or precipitation.

*Example III*

100 grams Dixon micronized graphite
250 grams distilled water
5 grams of General Aniline and Film Corporation K–30 polyvinyl pyrrolidone The above ingredients were treated in substantially the same way as the ingredients of Example I. Similar results were obtained.

In further experiments I have discovered that while with Dixon micronized graphite less than 2.6 parts of polyvinyl pyrrolidone to 100 parts of graphite are insufficient to reduce any appreciable amount of graphite to the colloidal state, with other sizes of graphite such proportions would be satisfactory. Contrary to what might be expected, the larger the size of the particles of the initial graphite, the less of the polyvinyl pyrrolidone is required. Conversely, if the initial graphite is in smaller particles a much larger amount of the polyvinyl pyrrolidone is required. Thus I have also discovered that using Dixon micronized graphite, more than 4 parts of polyvinyl pyrrolidone per 100 grams of graphite are not necessary, but that with finer particles of the initial graphite larger quantities of the polyvinyl pyrrolidone would be required. My hypothesis for this anomaly is that the amount of polyvinyl pyrrolidone depends on the area of the surface of the graphite.

The following examples illustrate that the larger the particle size, the less polyvinyl pyrrolidone will be necessary and the less liquid will be necessary to reach an equivalent viscosity.

Example IV 300 grams fine graphite
700 grams of water
8 grams polyvinyl pyrrolidone After mixing thoroughly, I milled for 1 hour. I let settle for 72 hours. There was only a trace of colloidal graphite in the supernatant liquid.

Example V 300 grams coarse graphite
500 grams water
8 grams polyvinyl pyrrolidone This mixture had approximately the same viscosity as the mixture of Example IV. After mixing thoroughly I milled for 1 hour. I let settle for 72 hours. There was considerable colloidal graphite in the supernatant liquid.

Example VI 300 grams fine graphite (of same fineness as used in Example IV)
700 grams water
12 grams polyvinyl pyrrolidone I mixed thoroughly. Then milled for 1 hour, then added water to bring the total to 1000 grams. Then I allowed to settle for 72 hours. I separated 100 grams of the supernatant liquid. I dried at 900° F. for one hour. I obtained 1.0 gram of dry precipitated colloidal graphite.

Example VII 300 grams coarse graphite (of same fineness as the graphite of Example V)
500 grams water
12 grams polyvinyl pyrrolidone This mixture had approximately the same viscosity as the mixture of Example V. After mixing thoroughly, I milled for one hour. I then added water to bring the total to 1000 grams. Then I allowed to settle for 72 hours. I separated 100 grams of the supernatant liquid. I dried at 900° F. for one hour. I obtained 0.65 gram of precipitated dry colloidal graphite.

Example VIII 290 grams fine graphite (Dixon micronite)
650 grams water
300 grams polyvinyl pyrrolidone The viscosity was a very high viscosity. I mixed thoroughly. I milled for an hour. I obtained about the same amount of colloidal graphite as in the other examples.

In the above examples references to sedimentation might be considered more properly syneresis or combination of syneresis and sedimentation depending on the relative proportions of solid, liquid, and colloid.

The size of the graphite used initially in order to produce my colloidal graphite may vary considerably. As pointed out above, if the size of the initial graphite is larger, less of the polyvinyl pyrrolidone is required and if the size of the initial graphite is smaller, more of the polyvinyl pyrrolidone will be required. The proportions of the polyvinyl pyrrolidone seems to depend on the surface area of the graphite which in turn depends upon the size of the particles of the graphite. If it is desired to reduce all of the graphite to 100% colloidal size, it is obvious that throughout the process additional polyvinyl pyrrolidone will have to be added inasmuch as additional pyrrolidone is necessary to wet the surface of all of the smaller particles. In the Dixon micronized graphite used in Examples I, II, and III, the manufacturer states that the average particle size is 2½ microns and that there are no particles larger than 10 microns.

If the graphite is mixed with the water without the addition of the polyvinyl pyrrolidone the mixture will have an extremely high viscosity. The viscosity is decreased by the addition of the polyvinyl pyrrolidone until a minimum viscosity is reached, which I believe to be the point at which the surface of the particles of graphite have all been wetted by the polyvinyl pyrrolidone. Therefore I prefer to add the polyvinyl pyrrolidone until the viscosity of the mixture has decreased to its approximate minimum. If at such time more polyvinyl pyrrolidone is added, the viscosity can then increase somewhat because the polyvinyl pyrrolidone will absorb some of the water to form a solution therewith.

The amount of graphite to water in the mixture can be varied although I prefer to use about 2 parts graphite to 5 parts of water.

In my work I have usually added the graphite and polyvinyl pyrrolidone alternately to the water increasing the viscosity as the graphite is added and then decreasing the viscosity as the polyvinyl pyrrolidone is added. However, I have also used other procedures. I have added graphite to a solution of polyvinyl pyrrolidone in water. I have added polyvinyl pyrrolidone to a dispersion of graphite in water. I have added water to a mixture of polyvinyl pyrrolidone and graphite. I have added graphite and polyviny pyrrolidone alternately to water. All of the ingredients could be added substantially simultaneously and mixed and then milled.

After milling the particles so that the colloidal graphite has been formed, the separation takes place more slowly if the particles of graphite not yet reduced to colloidal size are not appreciably larger than the particles of colloidal graphite. If the sediment consists of particles of relatively large size relative to the colloidal graphite, the separation takes place more quickly.

It is to be understood that the above described embodiments of my invention are for the purpose of illustration only and various changes may be made therein without departing from the spirit and scope of my invention.

I claim:

1. A composition of matter to be used in the obtaining of colloidal graphite consisting of a mixture of about 100 parts of micronized graphite, from 200–250 parts of water and from 2.5 to 100 parts of polyvinyl pyrrolidone.

2. A method of preparing an aqueous suspension of graphite of colloidal size comprising mixing particles of graphite, water and polyvinyl pyrrolidone in proportions of about 200–250 parts of water and from 2.5 to 100 parts of polyvinyl pyrrolidone to each 100 parts of graphite by adding graphite and polyvinyl pyrrolidone to water alternatively with stirring so that the viscosity is alternately increased and decreased until the addition is complete, and then milling to colloidal size, allowing the suspension to settle, and decanting the upper layer.

3. A method of preparing an aqueous suspension of graphite of colloidal size comprising mixing micronized graphite, water, and polyvinyl pyrrolidone in proportions of about 100 parts graphite, from 200 to 250 parts of water, and from 2.5 to 100 parts polyvinyl pyrrolidone, and milling to colloidal size, allowing the suspension to settle, and then decanting the upper layer.

4. A method of preparing an aqueous suspension of graphite of colloidal size comprising mixing micronized graphite, water, and polyvinyl pyrrolidone in proportions of about 100 parts graphite, from 200 to 250 parts of water, and sufficient polyvinyl pyrrolidone to reduce the viscosity of the mixture to 1000 cps., and milling to colloidal size, allowing the suspension to settle, and decanting the upper layer.

5. An aqueous suspension of colloidal graphite having added thereto a stabilizer consisting of polyvinyl pyrrolidone which is stable to electrolyte in an acid-alkaline range of from pH 4.3 to pH 11.3 or higher which consists of about 200–250 parts of water and from 2.5 to 100 parts of polyvinyl pyrrolidone to each 100 parts of graphite.

References Cited in the file of this patent

UNITED STATES PATENTS

| | | |
|---|---|---|
| 468,292 | Cole | Feb. 2, 1892 |
| 964,478 | Acheson | July 19, 1910 |
| 2,564,308 | Nagel | Aug. 14, 1951 |

FOREIGN PATENTS

| | | |
|---|---|---|
| 752,205 | Great Britain | July 4, 1956 |

OTHER REFERENCES

Schildknecht: "Vinyl and Related Polymers," Wiley, New York, N.Y.; pages 677–8 (1952).